Oct. 10, 1950     W. J. BAUROTH     2,524,872
ELECTRIC MOTOR

Filed April 5, 1946                              3 Sheets-Sheet 1

INVENTOR;
WALTER J. BAUROTH,
By
ATT'Y.

Oct. 10, 1950 W. J. BAUROTH 2,524,872
ELECTRIC MOTOR
Filed April 5, 1946
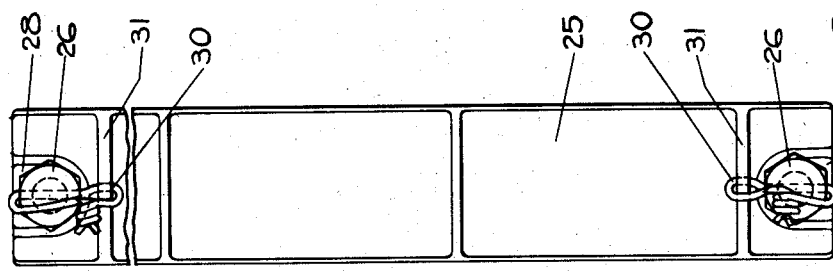
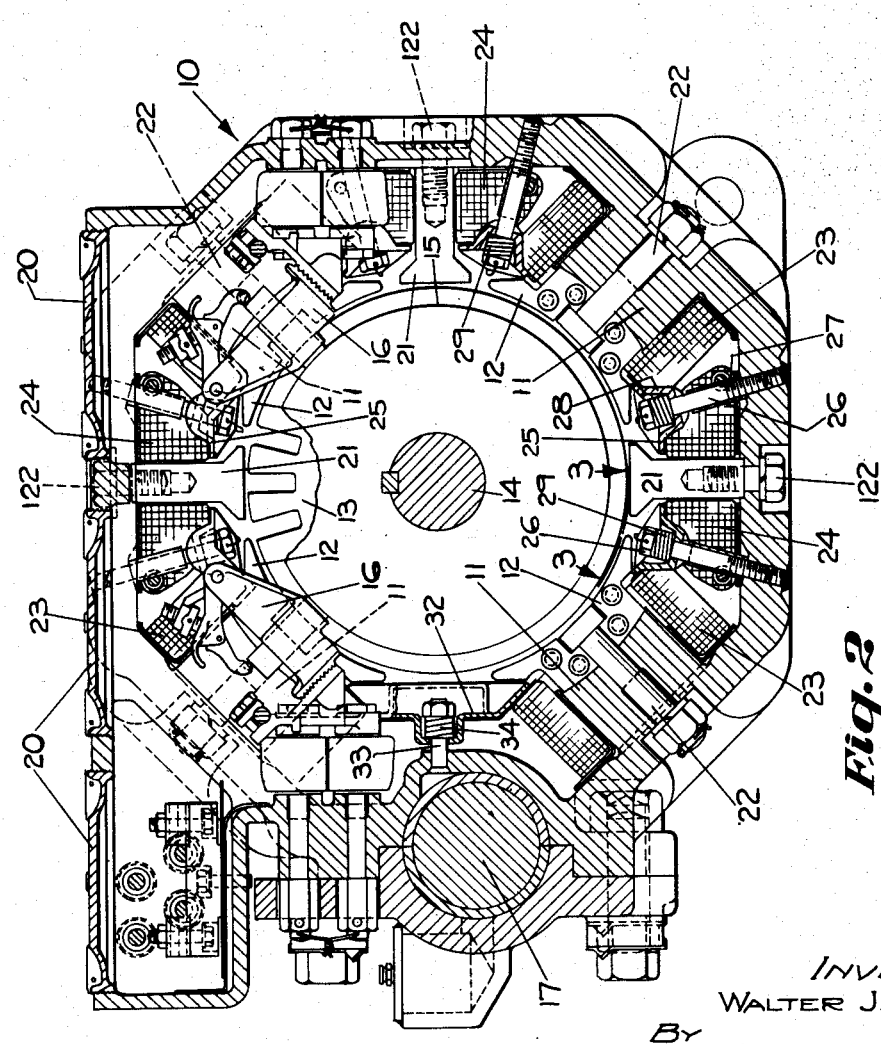
INVENTOR;
WALTER J. BAUROTH,
BY
ATT'Y.

INVENTOR;
WALTER J. BAUROTH,
BY
[signature]
ATTY.

Patented Oct. 10, 1950

2,524,872

UNITED STATES PATENT OFFICE 2,524,872

ELECTRIC MOTOR

Walter J. Bauroth, Columbus, Ohio, assignor to The Jeffrey Manufacturing Company, a corporation of Ohio Application April 5, 1946, Serial No. 659,702

5 Claims. (Cl. 172—36)

This invention relates to an electric motor, and an object of the invention is to provide improved means for clamping the energizing coils or windings of an electric motor in place.

A more specific object of the invention is to provide a traction or locomotive type electric motor of the direct current type having main poles and interpoles with improved means for clamping the windings of the interpoles and/or main poles in position.

Other objects of the invention will appear hereinafter, the novel features and combinations being set forth in the appended claims.

In the accompanying drawings,

Fig. 2 is a transverse sectional elevational view of the motor of Fig. 1;

Fig. 3 is an enlarged plan view of one of the coil clamping devices which may be considered taken along the line 3—3 of Fig. 2, eliminating other parts of the motor.

Figure 1:
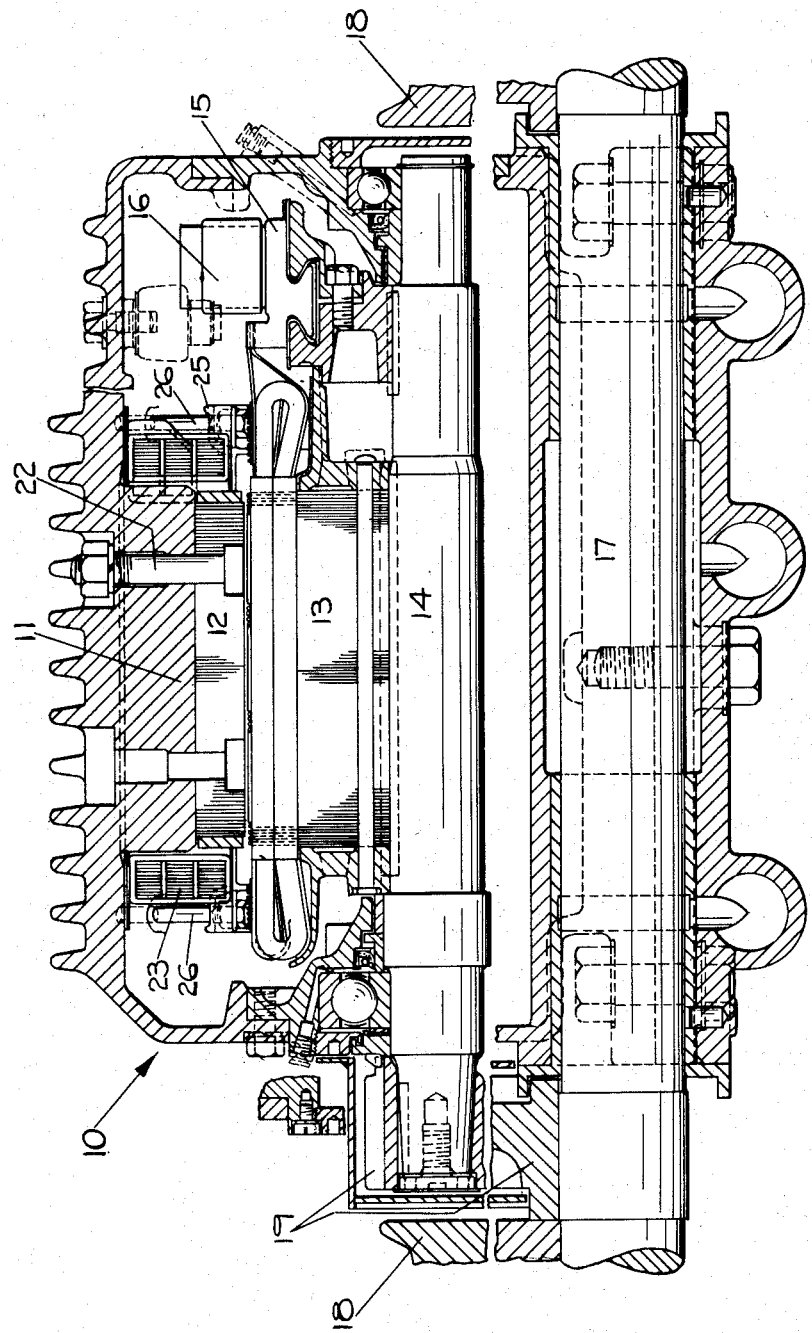
Fig. 1 is a sectional view along the axis of a motor incorporating the features of my invention, with parts broken away.

The electric motor illustrated is designed primarily as the traction motor for a mine or industrial locomotive, though in certain broad aspects of the invention it will be understood that it is not limited to this particular type of motor. The motor includes a main frame, housing or casing 10 which is of magnetic material and which is preferably provided with four radially inwardly extending integral field poles 11 which are spaced apart 90° and constitute the main poles of the electric motor which is, of course, a four pole motor in the embodiment illustrated.

In accordance with known construction, each of the poles 11 is provided with a pole shoe 12 having an arcuate pole face, which arcuate pole faces are adjacent the armature 13 of the motor which is mounted for rotation on a shaft 14. Armature 13 includes the usual commutator 15 and associated brushes and brush holders 16.

The main frame or casing 10 is journaled upon an axle or shaft 17 of the locomotive which is provided with locomotive traction wheels 18. Reduction gearing 19 is provided between the motor shaft 14 and the locomotive axle 17 whereby the motor drives the wheels 18 of the locomotive. As is clearly illustrated in the drawings, the housing 10 and associated parts provide a substantially complete enclosure for the motor, access to the interior being obtained through removable screw plates 20.

Between pairs of poles 11 commutation aiding interpoles 21 are provided. Each of these interpoles 21 extends radially inwardly from the casing or main frame 10 to which it is rigidly, but removably, attached by a plurality of machine screws 122 which extend from the outside of the casing and are threaded into threaded receiving apertures in said interpoles 21. The interpoles 21 have their pole faces terminating substantially adjacent the periphery of the roughly formed cylinder which is defined by them and the aforementioned faces of pole shoes 12, adjacent which the outer periphery of the armature 13 rotates.

It will be noted that there are only three interpoles 21, as compared with four main poles 11. This is due to the fact that there is inadequate space for an interpole adjacent the axle 17. Experience has shown that this is of no particular consequence, merely requiring additional turns on the energizing coils of the three interpoles, as compared with what would be required if four interpoles were employed.

It is also to be noted that the pole shoes 12 are removably, but rigidly, clamped to the main poles 11 by a plurality of through bolts 22 which extend from the pole shoes 12 radially outwardly and are provided with nuts and cotter keys on the outside of the casing 10. The bolts 22, of course, clamp the pole shoes rigidly against the field poles 11 and, as hereinafter pointed out in detail, a firm contact is provided between the contacting surfaces of the pole shoes 12 and the poles 11, particularly in view of the fact that the clamping of the coils or windings for energizing the poles is entirely independent of the pole shoes 12.

Each of the main poles 11 is provided with an energizing coil or winding 23 and improved means is provided to clamp each of these coils or windings 23 in position. Each of the interpoles 21 is also provided with a coil or winding 24 and one feature of the preferred form of clamping means of my invention is that it clamps one side or edge of both a main pole winding 23 and an interpole winding 24 against the housing or field structure or frame.

Figure 4:
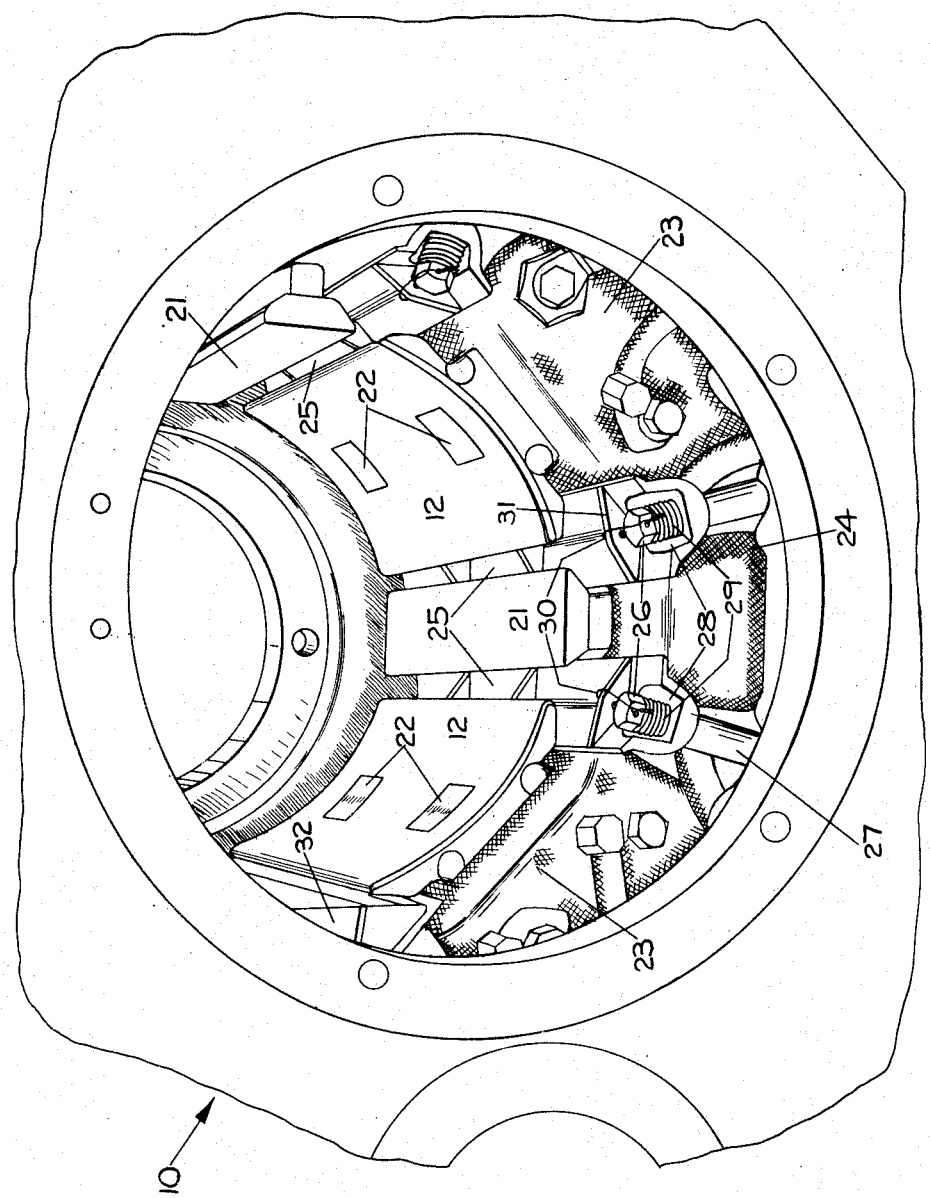
Fig. 4 is a photographic view of the interior of the motor, with the armature and other parts removed.

As clearly illustrated in Figs. 2 and 4 of the drawings, longitudinal or axially extending air gaps exist between the lateral edges of the main pole shoes 12 and the faces of the interpoles 21. Furthermore, an interpole 21 is interposed between two main poles 11 and in most instances there is an elongated axially or longitudinally extending clamp plate, bar or strip 25, preferably of non-ferrous metal, which is interposed between each main pole 11 and adjacent interpole 21. These clamp strips 25 have a length greater than the axial dimension or length of the main poles and interpoles, as clearly illustrated in Figs. 1 and 4 of the drawings, and thus they extend axially beyond the pole faces of both the main poles and interpoles.

Adjacent each end, each clamping plate 25 is retained for limited movement and between the poles of the field structure by a radially outwardly extending machine screw 26 which is preferably threaded into the casing 10. Screws 26 may, if desired, be provided with sleeves which are illustrated particularly at 27 in Figs. 2 and 4 of the drawings. The screws 26 extend through apertures at the opposite ends of the clamp bar 25 and are received in appropriate cups 28 formed therein, which cups also receive helical or coil springs 29 which provide for resilient clamping of the opposite ends of the clamp plates 25 through the medium of the bolts 26. The heads of the bolts 26 are preferably provided with transverse bores to receive locking wires 30 which lock the screws 26 in adjusted position by extending through them and through holes in upstanding webs 31 formed adjacent the ends of the clamp plates 25.

As is clearly illustrated in the drawings, the two opposite longitudinally extending side edges of the clamp plates, bars or strips 25 extend over adjacent lateral edges of a main pole winding 23 and an interpole winding 24. As a consequence, both types of pole windings are clamped along one side or edge by a single clamp plate or strip 25. Furthermore, the mounting of each clamp plate or bar 25 through the two end bolts 26 provides for pivotal movement of each clamp bar along its longitudinal axis and movement of each clamp bar along the axes of the bolts 26 by which it is retained. This is important because in practice, frequently, there is greater expansion or contraction of one of the windings than the other, as the temperature of the motor changes. This pivotal relation of the clamp bar 25 provides for differential expansion or contraction in windings 23 and 24 because the clamp bar 25 follows the coils while maintaining each against looseness at all times. Furthermore, the resilient clamping provided, particularly by the springs 29, allows expansion and contraction of the coils 23 and/or 24 occasioned particularly due to temperature changes in the motor.

It is furthermore to be particularly noted that the clamping means, including the bars 25, screws 26 and springs 29, tend to force or urge the coils 23 and 24 outwardly against the frame 10. This is important because the magnetic forces tend to move the coils in this same direction. Still further, and what is of considerable significance, is the fact that the clamping means of the coils 23 and 24 effects its clamping action absolutely independent of the presence of the pole shoes 12 and of the interpoles 21. That is, it is possible to remove the pole shoes 12 and/or interpoles 21 without in any way altering the clamping means which clamps the coils 23 and 24 in position.

In addition to the ease of assembly and disassembly which this produces, this is a further important feature in that it makes possible the rigid clamping of the pole shoes 12 against the main poles 11, thus insuring a minimum of reluctance of the magnetic path. Likewise the interpoles 21 can be rigidly clamped against the casing 10 with a similar result. Furthermore, in view of the independence of the clamping means it is obvious that the clamping bar 25 or a clamp retaining screw 26 may be removed without in any way altering the position of the pole shoe 12 or of an interpole 21, or without changing or removing a winding 23 or 24. For example, a clamping plate 25 may be moved radially along the path which it ultimately is to occupy, while the pole shoes 12, interpoles 21 and coils or windings 23 and 24 are all in place, either to insert it or remove it. Also, clamp retaining screws 26 are freely exposed at opposite ends of the field structure and entirely axially outside the area occupied by the coils 23 and 24, thus making them readily accessible for insertion or removal of them and/or a clamp strip 25.

As is best seen by reference to Fig. 2 of the drawings, a somewhat wider clamping bar or plate 32 is provided opposite the axle 17 and this clamping plate extends between the longitudinal edges of a pair of main pole windings 23, since there is no interpole between these two main poles. Except for this fact, however, the clamping means 23 and associated clamp retaining bolts and springs are essentially the same as the clamping strips 25 and associated screws 26 and springs 29. However, instead of a machine screw, such as screw 26, a bolt and nut 33 is provided adjacent each end of the clamping plate 32 in association with a helical or coil spring 34.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. An electric motor including a field structure having alternate side by side main poles and interpoles, windings for said main poles, windings for said interpoles, a winding clamp bar between each of said main poles and interpoles extending axially beyond the ends of said poles and engaging a main pole winding at one side and an interpole winding at the other, means adjacent each end of each of said clamping bars retaining each of said clamp bars positioned between said poles while permitting limited movement thereof, and a spring adjacent each end of each of said clamp bars urging each of said clamp bars to clamp said windings resiliently against said field structure, said spring means and clamp bar retaining means causing each of said clamp bars to move to follow expansion and contraction of either and/or both of said windings clamped thereby while retaining them always clamped against said field structure.

2. An electric motor including a field structure having alternate side by side main poles and interpoles, windings for said main poles, windings for said interpoles, a winding clamp bar between each of said main poles and interpoles extending axially beyond the ends of said poles and engaging a main pole winding at one side and an interpole winding at the other, and a spring adjacent each end of each of said clamp bars urging each of said clamp bars to clamp said windings resiliently against said field structure, said spring means causing each of said clamp bars to move to follow expansion and contraction of either and/or both of said windings clamped thereby while retaining them always clamped against said field structure.

3. An electric motor having a field structure including spaced poles having individual pole faces which cooperate to define a generally cylindrical outline adjacent which the motor armature rotates, an individual pole energizing coil for each of said poles, elongated clamping bars extending axially between adjacent poles and clamping a coil on each side thereof, said clamping bars extending axially beyond the ends of said poles, means adjacent each end of each clamping bar retaining the bar positioned between said poles while permitting movement thereof, and spring means adjacent each end of each bar urging it outwardly thereby to follow expansion and contraction of the coils while clamping them always outwardly against the field structure independently of said pole faces.

4. An electric motor having a field structure including spaced poles having individual pole faces which cooperate to define a generally cylindrical outline adjacent which the motor armature rotates, an individual pole energizing coil for each of said poles, elongated clamping bars extending axially between adjacent poles and clamping a coil on each side thereof, said clamping bars extending axially beyond the ends of said poles, and spring means adjacent each end of each bar urging it outwardly thereby to follow expansion and contraction of the coils while clamping them always outwardly against the field structure independently of said pole faces.

5. An electric motor having a field structure including spaced poles having individual pole faces which cooperate to define a generally cylindrical outline adjacent which the motor armature rotates, an individual pole energizing coil for each of said poles, elongated clamping bars extending axially between adjacent poles and clamping a coil on each side thereof, said clamping bars extending axially beyond the ends of said poles, means retaining the clamping bars for limited movement and positioned between said poles, and spring means adjacent each end of each bar urging it outwardly thereby to follow expansion and contraction of the coils while clamping them always outwardly against the field structure independently of said pole faces.

WALTER J. BAUROTH.

REFERENCES CITED

The following references are of record in the file of this patent:

UNITED STATES PATENTS

| Number | Name | Date |
|---|---|---|
| 760,086 | Storey | May 17, 1904 |
| 1,114,405 | Smoot | Oct. 20, 1914 |
| 1,238,243 | Yardley | Aug. 28, 1917 |
| 1,243,966 | Nichols | Oct. 23, 1917 |
| 1,414,773 | Coseo | May 2, 1922 |

FOREIGN PATENTS

| Number | Country | Date |
|---|---|---|
| 249,213 | Great Britain | Mar. 18, 1926 |